Patented Apr. 19, 1949

2,467,858

UNITED STATES PATENT OFFICE 2,467,858

PIGMENTED COATING COMPOSITIONS EXHIBITING RESISTANCE TO PIGMENT FLOTATION

Craig M. Sage, Schenectady, N. Y., assignor to General Electric Company, a corporation of New York No Drawing. Application December 29, 1947, Serial No. 794,444

5 Claims. (Cl. 260—38)

This invention is concerned with pigmented coating compositions having improved properties and methods of preparing the same. More particularly, the invention relates to a composition of matter exhibiting a decreased tendency to pigment flotation, the said composition comprising (1) a pigmented resinous coating composition and (2) from 0.000001 to 0.01 per cent, by weight, based on the weight of the coating composition, of the product of hydrolysis of a compound corresponding to the general formula

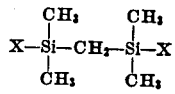

where each X is the same and is a halogen, e. g., chlorine, bromine, fluorine, etc.

One of the objects of this invention is to prepare pigmented resinous coating compositions having good pigment anti-flotation properties.

Another object of this invention is to eliminate the tendency of pigmented coating compositions to exhibit "silking" and "flow lines."

A further object is to produce pigmented resinous coating compositions which yield smooth surfaces without the danger of the appearance of what is known as "orange peel" in the surface.

Other objects of this invention will become more apparent as the description thereof proceeds.

Heretofore, the use of pigmented resinous coating compositions has often been accompanied by the appearance of several defects in the coated surface after the coating composition has dried or been cured. Among these defects has been the tendency of the coating to exhibit pigment flotation, i. e., the appearance of streaks of pigment in the coated surface. Another defect often resulting from the use of the aforementioned pigmented protective coatings has been the appearance of "flow lines" caused by the poor leveling of the coating composition. Finally, lacquers and baking enamels have often exhibited rough and uneven surfaces commonly referred to in the art as an "orange peel" surface.

I have now discovered that all the foregoing defects frequently encountered in connection with the use of pigmented protective or decorative coatings may be avoided by employing a small amount (e. g., from 0.000001 to 0.01, preferably from 0.00001 to 0.001 per cent, by weight, based on the total weight of the resin and pigment in the coating composition), of the isolated product of hydrolysis of a compound corresponding to the general formula described in the first paragraph of this specification. The elimination of the above-described defects is not accompanied by any perceptible detrimental effect on the drying rate or adhesion characteristics of the protective coating.

Various methods may be employed to prepare the halogenated silyl methylene described previously. For example, a trimethylhalogenosilane may be heated at elevated temperatures under super-atmospheric pressure in the presence of anhydrous aluminum chloride, and thereafter the contents of the reaction vessel are fractionally distilled to yield a fraction comprising essentially the pure bis-(dimethylhalogenosilyl)methane. The choice of, for instance, either trimethylchlorosilane or trimethylfluorosilane, will determine whether a chlorine or a fluorine is attached terminally to the silicon atoms.

The pigmented resinous coating compositions whose properties may be effectively improved by means of my claimed invention comprise liquid coating compositions ordinarily employed as pigmented decorative or protective surfacing compositions or enamels. These include, for example, pigmented oil-modified alkyd resins, either alone or in combination with modified or unmodified amido-aldehyde resins (i. e., aminoplast resins), e. g., urea-formaldehyde, melamine-formaldehyde resins, etc., pigmented coating compositions prepared, for example, from esters or ethers of cellulose, for instance, ethyl cellulose, cellulose acetate, etc., nitrocellulose, oil-modified phenol-aldehyde resins, for instance, oil-modified para-tertiary butyl phenol-aldehyde resins, etc., pigmented acrylic acid ester resins, pigmented chlorinated rubber compositions, as well as many other pigmented lacquers, enamels and paints employed as decorative and protective coatings.

My invention is particularly applicable in the case of modified (e. g., oil-modified) alkyd resins. By the term "modified alkyd resins" as used herein, I mean the resinous condensation product resulting from the reaction of one or more polyhydric alcohols with a polycarboxylic acid (or anhydride) and one or more of the following modifying ingredients, for instance, modifying oils, e. g., non-drying oils, semi-drying oils, drying oils, fatty oils, fatty oil acids, etc., derived either from vegetable or animal sources or produced synthetically, etc.; esters, specifically glycerides of fatty acids, etc.; and mixtures of one or more of these modifying ingredients with natural resins, as well as other equivalent products.

Examples of polycarboxylic acids (or anhydrides) are oxalic, malonic, succinic, adipic, phthalic acid (or anhydride), halogenated phthalic acids, for example, tetrachlorophthalic acid (or anhydride), 4-chlorophthalic acid, isophthalic acid, etc.

Examples of polyhydric alcohols (dihydric, trihydric, etc.) which may be used in this invention are ethylene glycol, diethylene glycol, propylene glycol, glycerine, sorbitol, pentaerythritol, etc. Monohydric alcohols, for example those boiling above 150° C., such as alkyl ethers of glycols, for instance, alkyl ethers of ethylene and diethylene glycol, etc., may also be used.

The modifying ingredients, including modifying oils in the raw, heated, or blown state, which may be employed in the preparation of the modified alkyd resins are, for example, linseed oil, China-wood oil, castor oil, soya bean oil, oiticica oil, linseed oil acids, coconut oil acids, palmitic acid, stearic acid, oleic acid, etc. The amount of the modifying ingredients may be varied within wide limits, for example, from 5 to 70 per cent, preferably from 10 to 60 per cent, by weight, of the total weight of the modifying ingredients, the polyhydric alcohol, and the polybasic acid or acids (or anhydride if used) present in the reaction mixture.

Equimolecular portions of the polyhydric alcohol and the polycarboxylic acid or anhydride may be used in making the modified alkyd resin. I prefer to use at least a slight excess of the polyhydric alcohol in order to cause the reaction to go more fully to completion. Techniques for making these modified alkyd resins will be clearly apparent from prior work published in connection with alkyd resin preparations by the many workers in this art.

Among the various pigments which may be incorporated in the resinous coating compositions may be mentioned, for example, carbon black, lamp black, ferric oxide, titanium dioxide, lithopone, ferric hydroxide, zinc chromate, zinc oxide, lead carbonate, lead chromate, silicates, for example, manganese silicate, etc., ferric ferrocyanide blue, sulphates, arsenates, and other inorganic salts, etc.

The amount of pigment employed in the coating composition may be varied within wide limits depending on the application, the resin employed, the pigment used, etc. Thus, I may use from 0.1 to 4 or more parts, by weight, of the pigment per part of the resin comprising the coating composition. Smaller or larger amounts may be employed without departing from the scope of the invention.

In order that those skilled in the art may better understand how the present invention may be practiced, the following example is given by way of illustration and not by way of limitation. All parts are by weight.

*Example*

A compound corresponding to the general formula

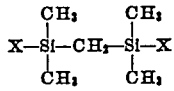

where X is the same and is a halogen, more particularly, bis-(dimethylchlorosilyl) methane, was prepared as follows:

To an Aminco steel hydrogenation bomb was charged 855 parts trimethylchlorosilane and 23 parts anhydrous aluminum chloride. The bomb was closed and the mixture heated at 375° C. and 1200 p. s. i. for 7 hours. The bomb was cooled and the liquid contents were fractionally distilled to yield a fraction comprising essentially pure bis-(dimethylchlorosilyl) methane boiling at about 176–177° C. at 754 mm.

The above-prepared compound was hydrolyzed in an amount of water in excess of that required to effect complete hydrolysis of the aforementioned halogenosilane. The product of hydrolysis was isolated and dissolved in toluene to make a 1 per cent, by weight, solution. One per cent, by weight, of this 1 per cent solution was added to a pigmented (with titanium dioxide and iron blue) oil-modified alkyd resinous coating composition exhibiting pigment flotation, the said coating composition comprising a castor oil-modified glyceryl phthalate alkyd resin modified with about 20 per cent, by weight, of a butylated melamine-formaldehyde resin. When a sample of this modified resin was applied to a flat surface and the surface air-dried, there was obtained a smooth, glossy film which was completely free of any evidence of pigment flotation. Prior to the addition of the hydrolyzed product, the aforementioned coating composition exhibited pigment flotation when applied to flat surfaces.

It will be evident to those skilled in the art that other bis-(dimethylhalogenosilyl) methanes may also be employed in place of the one used above. Thus I may use, for example, bis-(dimethylfluorosilyl) methane, bis-(dimethylbromosilyl) methane, etc.

My invention not only enables one to prepare pigmented coating compositions exhibiting a decreased or no tendency toward pigment flotation, but it is also possible to reclaim pigmented coating compositions rejected because of pigment flotation and make them acceptable as coating agents.

What I claim as new and desire to secure by Letters Patent of the United States is:

1. A composition of matter exhibiting good resistance to pigment flotation, said coating composition comprising (1) a pigmented resinous coating composition and (2) from 0.000001 to 0.01 per cent, by weight, based on the weight of the coating composition of the product of hydrolysis of a compound corresponding to the general formula

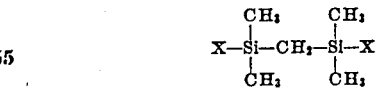

where each X is the same and is a halogen.

2. A composition of matter exhibiting good pigment anti-flotation properties, said composition comprising (1) a pigmented oil-modified alkyd resinous coating composition and (2) from 0.000001 to 0.01 per cent, by weight, based on the weight of the coating composition of the product of hydrolysis of a compound corresponding to the general formula

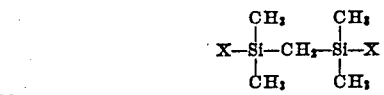

where each X is the same and is a halogen.

3. A composition of matter exhibiting good pigment anti-flotation properties, said composition comprising (1) a pigmented oil-modified phenol-aldehyde resinous coating composition and (2) from 0.000001 to 0.01 per cent, by weight, based on the weight of the coating composition, of the product of hydrolysis of a compound corresponding to the general formula

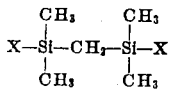

where each X is the same and is a halogen.

4. A composition of matter exhibiting good pigment anti-flotation properties, said composition comprising (1) a pigmented oil-modified alkyd resinous coating composition and (2) from 0.000001 to 0.01 per cent, by weight, of the product of hydrolysis of bis-(dimethylchlorosilyl)-methane, based on the weight of the coating composition.

5. A composition of matter exhibiting good pigment anti-flotation properties, said composition comprising (1) a pigmented oil-modified phenol-aldehyde resinous coating composition and (2) from 0.000001 to 0.01 per cent, by weight, based on the weight of the coating composition, of the product of hydrolysis of bis-(dimethylchlorosilyl) methane.

CRAIG M. SAGE.

No references cited.